United States Patent [19]

Bengtsson

[11] 4,181,506
[45] Jan. 1, 1980

[54] METHOD FOR RECOVERING CONCENTRATED SULPHUR DIOXIDE FROM WASTE GASES CONTAINING SULPHUR DIOXIDE

[75] Inventor: Sune Bengtsson, Vaxjo, Sweden

[73] Assignee: Aktiebolaget Svenska Flaktfabriken, Nacka, Sweden

[21] Appl. No.: 894,043

[22] Filed: Apr. 6, 1978

[30] Foreign Application Priority Data

Apr. 12, 1977 [SE] Sweden ................................ 7704193

[51] Int. Cl.² ............................................ B01D 53/14
[52] U.S. Cl. ................................... 55/48; 55/50; 55/55; 55/73; 423/242
[58] Field of Search ................... 55/48, 49, 50, 55, 73, 55/89; 203/26, 91, DIG. 14; 423/242 A

[56] References Cited

U.S. PATENT DOCUMENTS

| | | | |
|---|---|---|---|
| 2,487,577 | 11/1949 | Stanley | 423/242 A X |
| 2,497,421 | 2/1950 | Shiras | 55/89 X |
| 2,615,787 | 10/1952 | Randlett | 423/242 A X |
| 2,781,863 | 2/1957 | Bloch et al. | 55/73 X |
| 2,912,365 | 11/1959 | Irvine | 203/26 X |
| 3,362,457 | 1/1968 | Chirico | 203/91 X |
| 3,414,484 | 12/1968 | Carson et al. | 203/26 |
| 3,709,976 | 1/1973 | Tarhan | 55/73 X |
| 3,847,570 | 11/1974 | Gunther | 55/73 |
| 3,884,650 | 5/1975 | Woerner et al. | 55/55 X |
| 3,954,425 | 5/1976 | Gunther | 55/48 X |
| 3,985,529 | 10/1976 | Petersson | 55/73 X |

*Primary Examiner*—Robert H. Spitzer
*Attorney, Agent, or Firm*—Dann, Dorfman, Herrell and Skillman

[57] ABSTRACT

Improved efficiency in recovering $SO_2$ from waste gases is obtained in a system where the $SO_2$ is absorbed into a solution which is then distilled. The method of this application entails compressing the steam-$SO_2$ mixture issuing from the still before condensing out the steam, so that the heat from the compressed steam-$SO_2$ mixture may be used in generating the steam for the still, and the condensate may be recycled through the still, preferably after reheating the same.

9 Claims, 1 Drawing Figure

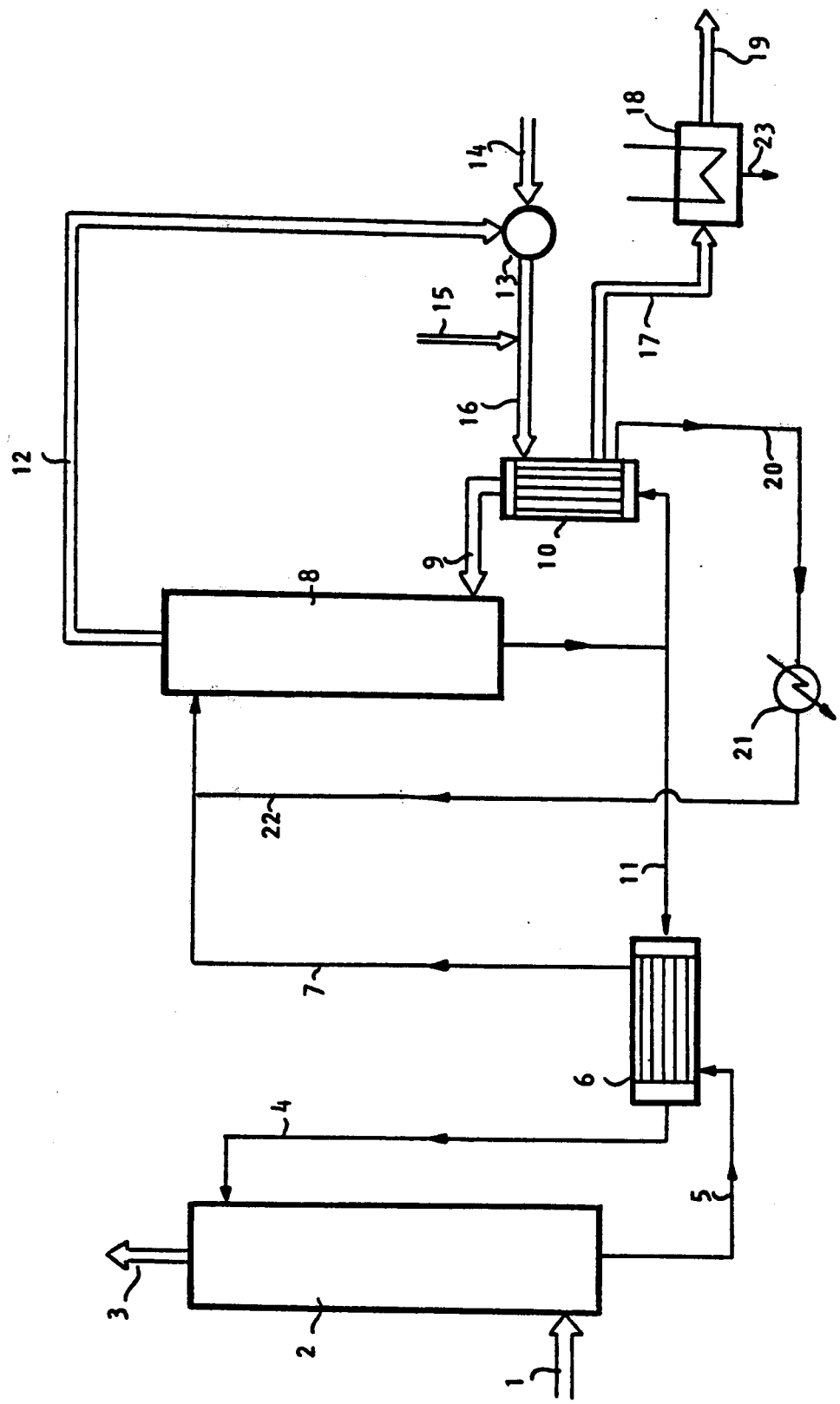

METHOD FOR RECOVERING CONCENTRATED SULPHUR DIOXIDE FROM WASTE GASES CONTAINING SULPHUR DIOXIDE

This invention relates to a method for recovering concentrated sulphur dioxide by treating the gas with water or aqueous solutions of substances binding sulphur dioxide in an absorption device.

In literature, different systems for concentrating gases containing sulphur dioxide are described. A feature common to most of the known methods is a very high specific energy consumption, because this consumption mostly is in proportion to the gas flow primarily to be treated and not to the flow of sulphur dioxide. As a result thereof, the recovery of sulphur from flue gases at the combustion of fossil fuels, so-called waste gases with low $SO_2$ content from metal smelteries, Claus-plants, sulphuric acid factories and other industrial processes emitting $SO_2$ in most cases requires much energy.

As an example can be mentioned a method, which is described in Ullman Encyklopädie der Technischen Chemie (1964), vol. 15, page 420, in which method sulphur dioxide in liquid state is recovered from roasting gases by compression and cooling the entire roasting gas flow to about $-60°$ C. This method, in addition to its high energy consumption, requires for the said purpose an equipment which is very expensive, due to the high pressure.

Several methods for recovering concentrated sulphur dioxide from flue gases are described in literature, in which methods cold water is used as absorbent. In Kemisk Tidskrift No. 1, 1970, pages 34–38, for example, a method of concentrating of smelter gases with an $SO_2$-content of 4.5% is described. The absorption is carried out at a pressure of 1.2 bar in brackish water, which normally has a temperature below $5°$ C. The recovery of pure sulphur dioxide thereafter is carried out by distilling at about $110°$ C. with open steam, condensation of accompanying water vapour in indirect condensers, drying with concentrated sulphuric acid and final condensation of sulphur dioxide to liquid state at about $-15°$ C. This method requires access to large amounts of cold water, but if this requirement can be met, and ample steam is available, this method is substantially more energy saving than the method described above. The steam amount for the distilling is said to be 18 to 27 t/h or 3 to 4.5 t steam/t $SO_2$.

Several methods of distilling absorbed $SO_2$ under vacuum are known. In the German patent specification No. 1,667,745 and the German Laid Out Publication No. 1,567,462 two processes for desorption in several steps of $SO_2$ from water are described, in which the water containing $SO_2$ is passed through a number of distilling steps operating under successively increasing vacuum. The $SO_2$ and the steam distilled at each step are pumped back to the next foregoing step. In this way, a substantially reduced pressure difference had to be overcome, compared with what should have been the case if each step was connected to a pump to pump out $SO_2$ against atmospheric pressure. In order to obtain a distillation of $SO_2$ so good that the absorbent can be utilized in a new absorption, the pressures are required to be so extremely low that these methods hardly can be applied in practice.

A further method of $SO_2$-recovery by absorption in water and subsequent vacuum desorption is described in German Laid Out Publication No. 1,769,303. In this method, which is open on the water side, the distilling of $SO_2$ can be carried out with steam produced by the heat content in the crude gas treated in the absorption unit. In order to bring about a satisfactory $SO_2$-distillation with this relatively small amount of steam, however, the absorption liquid must be acidified by adding sulphuric acid prior to the distillation. After the distillation the absorption liquid must be neutralized with soda before it can be emitted into the recipient. This method, therefore, involves considerable operation costs in the form of high chemical consumption and undesired load on the recipient.

A disadvantage of the water absorption methods for $SO_2$ is that the absorbent is not recirculated for new absorption, i.e. such processes are open on the water side. In order to practically render possible a closing of an $SO_2$-absorption process, an absorbent is required which is more efficient than water. In Ullman Encyklopädie der Technischen Chemie (1964), vol. 15, pages 418–420, two methods for $SO_2$-recovery are described which substantially are closed on the liquid side. In the process described first dimethylanilin, and in the second process described a xylidine-water mixture is used for the $SO_2$-absorption. Dimethylanilin as well as xylidine, however, must be regarded as highly toxic, which implies substantial risks in the handling as well as for undesired emission. These methods, therefore, have been used in practice to a relatively limited extent.

A method using sodium citrate solution for the $SO_2$-absorption is described in U.S. Pat. No. 3,886,069. In said patent a process of desorption of $SO_2$ with open steam in a column still is described. Outgoing $SO_2$-water vapour mixture is cooled for the condensation of supplied desorption steam. Thereby the latent heat content is transferred in conventional manner to the cooling agent in the condenser and cannot any longer be utilized for further $SO_2$-distillation. This is the conventional method of distilling an absorbed gas component with steam. In the process layout described last, problems with the water balance can easily arise owing to steam condensation in the still. It is, therefore, preferable not to supply the distillation steam (open steam) directly to the still, but to a re-boiler where distillation steam is generated by indirect contact with solution from the bottom outlet of the still. A great advantage of the process described is its relatively simple structure compared with most of the previously described processes. An essential disadvantage, however, is the relatively high specific steam consumption for gases containing low $SO_2$-concentrations and the high operation costs resulting thereof.

The present invention has the object of proposing an absorption/distillation method, which does not involve the aforementioned high energy consumption. This object is achieved thereby that the method according to the invention has been given the characterizing features defined in the attached claims. The invention is based on the surprising discovery that the energy consumption in the form of steam decisively can be reduced in an absorption/distilling process according to the method described last, in such a manner, that steam used for distillation together with distilled $SO_2$ is compressed, which implies that outgoing steam can be utilized for the production of steam for distillation in a re-boiler. In the method according to the invention, at first crude gas containing sulphur dioxide is treated in an absorption tower, preferably with counterflow contact gas-liquid.

The sulphur dioxide dissolved in the absorbent then is distilled in a column still by the supply of steam to a re-boiler connected to the column still. According to the invention the distillation can be carried out at a vacuum, at atmospheric pressure or at a somewhat increased pressure. It is especially important for a low steam consumption according to the method, that solution ingoing to the still has a temperature substantially equal to the temperature prevailing at the bottom of the still. This can be achieved when that the distillation is carried out at a vacuum corresponding to the absorption temperature, or that outgoing solution from the absorption tower efficiently is heat exchanged with solution outgoing from the still, and that ingoing solution to the still tower is preheated.

The steam-$SO_2$ mixture outgoing from the top of the still is sucked by a pressure-increasing apparatus to a re-boiler where the steam is caused to condense, whereby at the same time steam of a lower temperature and pressure is generated in the re-boiler and will constitute an efficient steam for the distillation process. The pressure-increasing apparatus may be a mechanical compressor, in which case a smaller amount of additional steam is required, but preferably a steam ejector is applied for the object of increasing the pressure, because the use of a mechanical compressor involves great material problems and very high investment costs. When using a steam ejector, the investment will be only a fraction of the investment costs required for a mechanical compressor, and the material problems are substantially reduced. Moreover, the steam ejector can be designed for practically any size of flow. The steam ejector, however, must be operated by steam of a pressure, which is higher than the pressure of the suction mixture. When a steam ejector is used, not all of the steam will be condensed in the re-boiler, which therefore in this case is connected to a condenser for condensation of the excess steam. After the condensation of steam an $SO_2$-gas remains which contains a small amount of residual moisture and inert gas. As a consequence of the method, this concentrated sulphur dioxide gas after drying, for example, can be utilized for the production of liquid sulphur dioxide in a cooling plant, for the production of sulphuric acid in a contact plant, or for the production of elementary sulphur in a Claus-plant.

Due to the invention the main part of the steam from the still will condense in the re-boiler in the way described. The reboiler, thus, also acts as a condenser, so that according to the method described the need of a condenser is reduced to a final condenser of substantially smaller dimensions, or the condenser can entirely be abolished. As a result thereof, also the cold water consumption decreases substantially, and also the investment costs are reduced considerably compared with conventional processes involving steam distillation.

The consumption of steam for a specific $SO_2$-distillation and a certain compression ratio (ratio between final pressure and suction pressure) in a steam ejector decreases with increasing steam pressure. In a process laid out according to the invention, the steam consumption is reduced by 30–70% compared with a conventional distillation process.

An absorption/distillation method for $SO_2$ according to the invention can be carried out by choosing between several embodiments. In the purification of relatively cold gases, for example, it is preferred to absorb $SO_2$ at a low temperature and thereafter to carry out the distillation at substantially higher temperatures. In this case efficient heat exchange of the liquid flows circulating between the absorption and still towers is required. In the recovery of $SO_2$ from hot gases, however, i.e. at gas temperatures above ca. 130° C., it was found more suitable to carry out the absorption and distillation at substantially the same temperature. In this embodiment, a vacuum corresponding to the liquid temperature in the system is applied in the still, which renders it possible to entirely abolish heat exchange of the liquid flows between the absorption and the distillation tower. In the embodiments of the invention described above it has proved advantageous to carry out the distillation within the temperature range 40° to 130° C., which for the systems water vapour-aqueous solutions approximately corresponds to an absolute pressure of 0.07 to 2.7 bar.

The invention is explained in greater detail by way of the accompanying FIGURE, which in a schematic way shows the method according to the invention.

Dust-cleaned gas containing sulphur dioxide is led via a conduit 1 to an absorption tower 2, and purified gas is discharged via a conduit 3. The absorbent in which the sulphur dioxide is taken up is led to the absorption tower via a conduit 4 and discharged via a conduit 5 to a heat exchanger 6 possibly provided and further via a conduit 7 to the still 8. In the still $SO_2$ is removed from the solution by the supply of steam via a conduit 9. The solution poor in $SO_2$ is led from the still through the re-boiler 10, where steam for the distillation is generated. Liquid flow required for the absorption is led via a conduit 11 to the heat exchanger 6 possibly provided before the solution is fed into the absorption tower via the conduit 4. The $SO_2$-steam mixture is discharged from the tower still 8 via a conduit 12 to a pressure-increasing apparatus 13. When said pressure-increasing apparatus is a steam ejector, driving steam is supplied via a conduit 14. When the pressure-increasing apparatus is a mechanical compressor, additional steam is supplied via a conduit 15. The total $SO_2$-steam flow is passed into the re-boiler 10 via a conduit 16. In the re-boiler a substantial part of the steam condenses. $SO_2$ and remaining steam are led via a conduit 17 to a cooler 18 for the condensation of water vapour, from which cooler a concentrated $SO_2$-gas is discharged via a conduit 19. From the re-boiler 10 a condensate flow is discharged in a conduit 20 and led to a pre-heater 21 and further in a conduit 22 back to the conduit 7. From the cooler 18 a condensate flow is discharged in a conduit 23. The concentrated $SO_2$-gas discharged from the conduit 19 can be processed according to processes mentioned above to liquid $SO_2$, concentrated sulphuric acid or elementary sulphur.

The invention can be illustrated by way of the following example: To the absorption tower a waste gas of 100,000 $m^3$ norm/h with an $SO_2$-concentration of 5000 ppm was supplied. 90% of the $SO_2$-content was absorbed in a flow of absorption liquid of 300 $m^3$/h. The $SO_2$-concentration in the liquid was 0.070 $kmol/m^3$.

In a conventional embodiment of the distillation the following steam consumption figures were obtained:

By steam addition of 18.4 t/h in the still, the $SO_2$-content in the liquid could be reduced to 0.0014 $kmol/m^3$ at a pressure of 0.20 bar absolute at the still bottom. The steam addition corresponds to a specific steam consumption of 14 t/t recovered $SO_2$.

In a process laid out according to the invention the pressure at the still bottom also was 0.20 bar absolute, and the temperature was 60° C. Due to the pressure losses in the still, the pressure at the still top was 0.19 bar absolute, i.e. 0.01 bar lower than at the bottom. The gas discharged from the still had a steam partial pressure of 187 mbar and an $SO_2$ partial pressure of 4.0 mbar, which corresponds to 17.3 t/h $H_2O$ and 1.32 t/h $SO_2$.

In the re-boiler a mean temperature difference of 7° C. and at the same time the same distillation efficiency, i.e. reduction of the $SO_2$-content of the solution, as in conventional distillation process were desired. This was achieved thereby that the pressure of $SO_2$-steam mixture discharged from the still was raised from 0.19 bar to 0.30 bar in the steam ejector. The amount of driving steam at a pressure of 20 bar consumed for this purpose was 9.8 t/h, which corresponds to a specific steam consumption of 7.4 t/t $SO_2$. The steam consumption, thus, was reduced by about 47%. The steam was calculated to cost SwCr 30:-/t, and the savings made, therefore, are SwCr 2.06 Mio/year at a calculated operation time of 8000 h/year.

In a plant laid out for a driving steam pressure of 6 bar, 11.5 t/h steam were consumed for obtaining the same $SO_2$-distillation and compression in the ejector. The steam saving in this case is about 37.5% or about SwCr 1.66 Mio/year. As is apparent from these examples, the consumption of driving steam decreases with higher driving steam pressure.

I claim:

1. A method of recovering the concentrated sulphur dioxide from waste gases containing $SO_2$, by treating the gas with water or aqueous solutions of substances binding sulphur dioxide in an absorption device, characterized by the steps of feeding the solution rich in absorbed $SO_2$ into a column still and distilling it with steam, compressing the steam-$SO_2$ mixture discharged from the still, and at least partially condensing the steam in a heat exchanger re-boiler where steam ingoing to the still is generated.

2. A method according to claim 1, characterized in that the compression of steam-$SO_2$ mixture outgoing from the still is carried out in an ejector.

3. A method according to claim 1, characterized in that the compression of steam-$SO_2$ mixture outgoing from the still is carried out in a mechanical compressor.

4. A method according to claim 1, characterized in that the temperature in the still is maintained between 40° and 130° C.

5. A method according to claim 1, characterized in that the steam-$SO_2$ mixture is led from the reboiler to a cooler where the remaining system is condensed.

6. A method according to claim 5, characterized in that the condensate from re-boiler and cooler is combined with the $SO_2$-containing solution which is fed to the still.

7. A method according to claim 1, characterized in that solution discharged from the still is heat exchanged with solution rich in $SO_2$ being fed into the still.

8. A method according to claim 7, characterized in that the temperature of fed solution going into the still is increased such that the temperature of the fed solution has a temperature substantially equal to the temperature prevailing at the bottom of the still after heat exchange of the fed solution with solution discharged from the still.

9. A method according to claim 1 or 8, characterized in that the temperature of the condensate from the re-boiler is increased and then is fed into the still with the $SO_2$-containing solution.

* * * * *